(12) United States Patent
Manley et al.

(10) Patent No.: US 7,624,106 B1
(45) Date of Patent: Nov. 24, 2009

(54) METHOD AND APPARATUS FOR GENERATING USER-LEVEL DIFFERENCE INFORMATION ABOUT TWO DATA SETS

(75) Inventors: Stephen L. Manley, Pleasanton, CA (US); William R. Taylor, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 310 days.

(21) Appl. No.: 10/954,381

(22) Filed: Sep. 29, 2004

(51) Int. Cl.
*G06F 7/00* (2006.01)
*G06F 11/00* (2006.01)

(52) U.S. Cl. .............................. 707/6; 714/6
(58) Field of Classification Search ................ 707/200, 707/203–204, 201, 202, 10, 6; 714/6
See application file for complete search history.

(56) References Cited

U.S. PATENT DOCUMENTS

| | | | |
|---|---|---|---|
| 5,813,017 A * | 9/1998 | Morris ....................... 707/204 |
| 5,845,274 A * | 12/1998 | Chadha et al. ................. 707/2 |
| 5,958,008 A | 9/1999 | Pogrebisky et al. |
| 6,131,118 A | 10/2000 | Stupek, Jr. et al. |
| 6,138,157 A | 10/2000 | Welter et al. |
| 6,219,053 B1 | 4/2001 | Tachibana et al. |
| 6,314,463 B1 | 11/2001 | Abbott et al. |
| 6,505,245 B1 | 1/2003 | North et al. |
| 6,615,225 B1 * | 9/2003 | Cannon et al. .............. 707/204 |
| 6,694,336 B1 * | 2/2004 | Multer et al. ............... 707/201 |
| 6,725,268 B1 | 4/2004 | Jacket et al. |
| 6,738,789 B2 * | 5/2004 | Multer et al. ............... 707/201 |
| 6,748,504 B2 | 6/2004 | Sawdon et al. |
| 6,779,003 B1 * | 8/2004 | Midgley et al. ............. 707/204 |
| 6,847,984 B1 * | 1/2005 | Midgley et al. ............. 707/204 |
| 6,928,526 B1 | 8/2005 | Zhu et al. |
| 6,970,887 B1 | 11/2005 | Brigham et al. |
| 6,993,539 B2 * | 1/2006 | Federwisch et al. ......... 707/201 |
| 7,043,503 B2 | 5/2006 | Haskin et al. |
| 7,065,619 B1 | 6/2006 | Zhu et al. |
| 7,085,785 B2 | 8/2006 | Sawdon et al. |
| 7,111,014 B2 | 9/2006 | Sawdon et al. |
| 7,111,021 B1 | 9/2006 | Lewis et al. |
| 7,117,491 B2 * | 10/2006 | Ferreira Alves et al. ..... 717/168 |
| 7,346,623 B2 | 3/2008 | Prahlad et al. |
| 2002/0116395 A1 | 8/2002 | Christensen |
| 2002/0143733 A1 | 10/2002 | Mukkamalla et al. |
| 2003/0050915 A1 | 3/2003 | Allemang et al. |
| 2003/0182313 A1 | 9/2003 | Federwisch et al. |

(Continued)

*Primary Examiner*—John E Breene
*Assistant Examiner*—Joshua Bullock
(74) *Attorney, Agent, or Firm*—Blakely, Sokoloff, Taylor & Zafman LLP

(57) ABSTRACT

A method and apparatus to generate information representing differences between two data sets are described. Information representing differences between a first data set and a second data set is acquired, where the first and second data sets each include multiple nodes. A traversal map that identifies nodes for which a difference has been detected between the first and second data sets is generated, and then during an output phase, a hierarchy of nodes is traversed to generate output indicating user-level differences between the first and second data sets. The traversal map is used to avoid traversing at least some of the nodes in the hierarchy during the output phase. A child map may be generated to represent parent-child relationships between the nodes and used during the output phase to prefetch certain nodes in the hierarchy.

29 Claims, 10 Drawing Sheets

U.S. PATENT DOCUMENTS

| | | |
|---|---|---|
| 2003/0182322 A1 | 9/2003 | Manley et al. |
| 2004/0125103 A1 | 7/2004 | Kaufman et al. |
| 2004/0210578 A1 | 10/2004 | Taitel |
| 2005/0004954 A1 | 1/2005 | Soule, III |
| 2005/0033748 A1 | 2/2005 | Kazar et al. |
| 2005/0198017 A1* | 9/2005 | Gaponoff ..................... 707/3 |
| 2005/0267906 A1 | 12/2005 | Brigham et al. |
| 2006/0004725 A1 | 1/2006 | Abraido-Fandino |
| 2006/0074990 A1* | 4/2006 | Burka et al. ............... 707/200 |
| 2006/0080270 A1 | 4/2006 | Mori |
| 2006/0235900 A1 | 10/2006 | Anonsen |

* cited by examiner

METHOD AND APPARATUS FOR GENERATING USER-LEVEL DIFFERENCE INFORMATION ABOUT TWO DATA SETS

FIELD OF THE INVENTION

At least one embodiment of the present invention pertains to storage systems, and more particularly, to a method and apparatus to generate user-level information about the differences between two data sets.

BACKGROUND

There has long been a demand for the ability to describe the differences between two data sets. The data sets may be completely independent of each other or they may be the same data set captured at two different points in time (e.g., two "snapshots" of a file system). The value of such an ability crosses applications. Data backup, Storage Resource Management (SRM), and mirroring are just three of the applications that typically need to efficiently discover and describe the differences between data sets.

Classic backup technologies can describe the changes in a data set, including renames, deletes, creates, and modification of particular elements. However, their methods for finding the changes between the systems are extremely slow. They "walk" (traverse) the entire file system in a breadth-first or depth-first manner, taking advantage of none of the optimized data set differencing tools that internal replication tools can utilize. To reduce backup media consumption and system load, backup applications sometimes run differential or incremental backups, in which they attempt to capture only the data that has changed from the previous backup. However, these differential or incremental backups tend not to run significantly faster than the full-system backup, because discovering and describing the changes takes so long.

SRM tools attempt to capture information about the locus of activity on a system. As with backup applications, finding out what parts of the system are active, usually done by determining what is modified, is extremely slow.

Mirrors have difficulty in resolving changes to both sides of a mirror. In mirroring, the data residing between mirrored systems can diverge when both sides of the mirror can be written. Asynchronous mirrors never have a completely current version of the source data. If the source becomes inaccessible and the mirror is brought online for user modification, each half of the mirror will contain unique data. The same can happen to a synchronous mirror, if both sides are erroneously made modifiable. In either case, to resolve the differences between the divergent mirrors will require discovering and describing those differences to the user.

Thus far, technologists have separated the problems of discovering and describing the changes between two datasets. For example, mirroring applications tend to be extremely efficient at discovering and replicating the changes between versions of a dataset. However, they are incapable of describing those changes at a level that is useful to a human user. For example, they can tell a user which blocks of which disks have been changed, but they cannot correlate that information to the actual path and file names (e.g., "My Documents\2003\taxes\Schwab Statements\July"), i.e., "user-level" information.

Another technique, which is described in co-pending U.S. patent application Ser. No. 10/776,057 of D. Ting et al., filed on Feb. 11, 2004 and entitled, "System and Method for Comparing Data Sets" ("the Ting technique"), can print out the names of files that are different between two data sets. However, the Ting technique does not attempt to describe a potential relationship between those differences. For example, a file may have been renamed from patent.doc to patent_V1.doc. The Ting technique would claim that one data set had a file named patent.doc and the other has a file named patent_V1.doc; however, it would not look more deeply into the problem and declare that patent.doc had been renamed to patent_V1.doc. Understanding the relationships between the differences is a critical aspect of the overall problem. Moreover, the method of describing the changes in the Ting technique is relatively expensive and slow. The Ting technique was designed with the assumption that the differences will be very few, and that processing effort should therefore be expended in quickly verifying the similarities between the two data sets. This assumption does not often hold true in certain applications.

What is needed, therefore, is a technique to quickly and efficiently generate user-level information about the differences between two data sets.

SUMMARY OF THE INVENTION

The present invention includes a method and apparatus to generate information representing differences between two data sets. In certain embodiments of the invention, the method includes acquiring information representing differences between a first data set and a second data set, where the first and second data sets each include multiple nodes, and building a traversal map that identifies nodes for which a difference has been detected between the first and second data sets. The method further includes traversing a hierarchy of nodes to generate output including user-level difference information about the first and second data sets, including using the traversal map to avoid traversing at least some of the nodes in the hierarchy.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
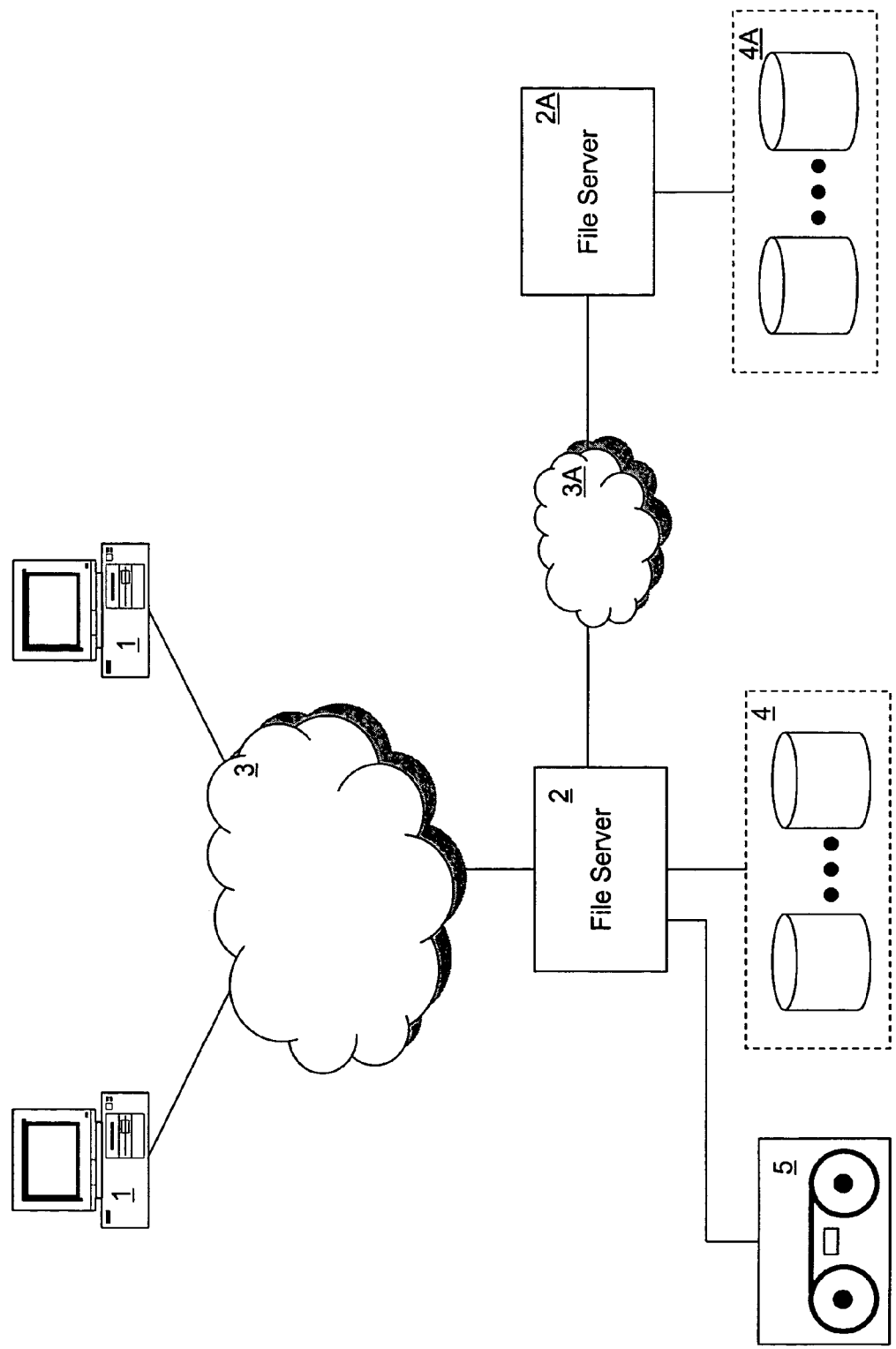
FIG. 1 shows a network environment that includes devices which can implement the invention.

A method and apparatus to quickly and efficiently generate user-level information about the differences between two data sets are described. The technique introduced herein solves the problem that present technology can either discover changes between two data sets quickly without being able to describe them at a user level, or it can describe changes at a user level without being able to quickly discover them. The technique focuses on quickly and efficiently describing changes at a user-level that existing technologies have quickly discovered at a non-user level (or sub-user level). Each of the data sets can be, for example, a file system or a portion of a file system in a storage system.

The term "user-level" as used herein (as in "user-level difference information") refers to information about differences expressed in terms of the names of directories and/or files, i.e., path and file names. Also, the terms "difference" and "change" and variations thereof are used interchangeably herein to facilitate description; hence, a reference to the "changes" from one data set to another do not necessarily imply that the two data sets represent the same data at two different points in time or are otherwise related.

The technique introduced below efficiently describes the differences between two data sets, in a system-independent, human/application usable manner. Specifically, the technique provides a characterization of the data set differences using full user path names and describing the user-level description of changes (files deleted, created, renamed, etc.) The technique can utilize any existing technology for rapidly determining data set changes, which is generally incapable of describing those changes, to generate the description of those changes.

Before describing the technique in detail, it is useful to define certain terms used herein:

Breadth-first search—A method of walking a hierarchical set of data (a "tree"), in which the walk always looks at all elements of a tree at a certain level before proceeding to the next level. This type of search is akin to reading a page from left-to-right.

Change map—A data structure that stores non-user-level information on a per directory or per file basis indicating changes that have been made.

Child map—A data structure that enables a system to easily and rapidly track certain interesting parent-child relationships in the data sets. For purposes of this description, an interesting child directory is one in the path of a changed file. The child map can be actually structured as two files. One is a sparse index file, similar to the parent map. That index file, however, always refers to a location in a second file. The second file, at that offset, then contains the list of interesting children. This bifurcated structure of a child map can be advantageous, because while a file usually only has one parent, a parent can have potentially thousands of child directories. A 4-byte per entry index file is small. However, if we allocated 400,000 bytes per entry, for example, the index file would be unmanageable. Hence, in certain embodiments, the index file merely indexes into a sequentially written file, which uses the minimal amount of space.

Depth-first search—A method of walking a hierarchical set of data (a "tree"), in which the walk always proceeds down the "left-most" branch of the tree until it reaches a leaf (no more sub-directories to walk) and then proceeds to walk the next "left-most" branch. This type of search is akin to reading a page from top to bottom.

Hard link—A Unix based feature in which one file can be known by multiple names. Any modification via one of the names affects all the others. Directories may not have hard links, only files.

Inode—a container of metadata about a file that a file system uses internally to keep track of the file. Each file has one inode.

Inode number—a unique identifier of an inode within an active version of a file system. An inode and generation number uniquely identify an inode across the history of a file system.

Parent map—Any method or data structure that enables a system to identify the directory or directories that contain a file. Standard Unix systems can only track the parents of directories, not of files. In general, this is due to hard links—a file may be contained in hundreds of different directories, if each of those directories contains a hard link to that file. This degree of tracking is too expensive in those cases. The technique introduced below uses a sparsely populated index file to track parents. Each inode can store/retrieve its parent at a fixed offset in this index file (size of the value needed to record the parent inode number multiplied by the child inode number—e.g., 4 bytes*child inode). If an inode has more than one parent (multiple hard links, some of which exist in different directories), then the index file refers to a differently structured set of files to return those parents.

Path—The full name of a file, from the root of the data set to the file itself.

Traversal map—A data structure that stores the identities of certain directories that have changed and therefore are to be looked at while traversing the data set during the output phase.

Figure 8:
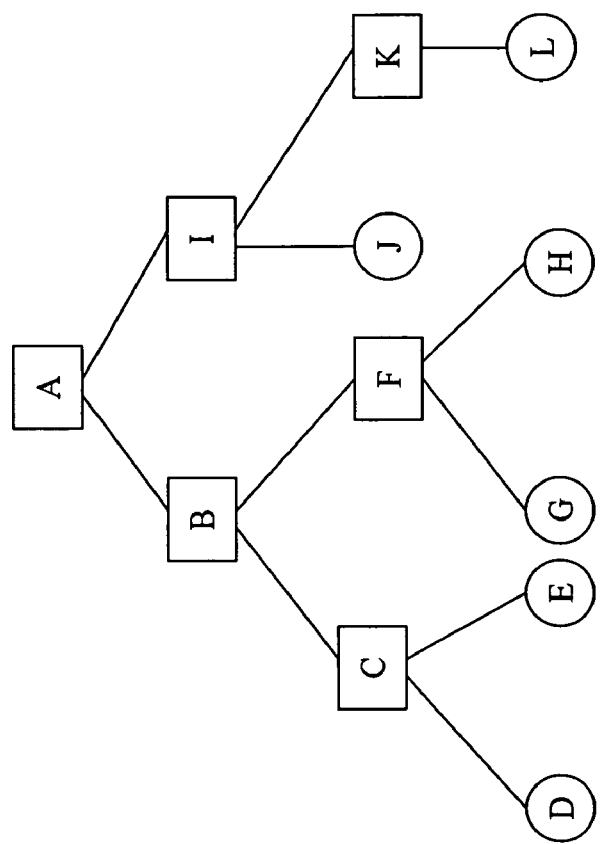
FIG. 8 shows an example of a hierarchical data set.

The algorithm introduced herein receives a list of non-user level differences between two data sets in raw form from an outside agent and generates a store of information based on that data. The outside agent may be, for example, a data mirroring application such as SnapMirror, made by Network Appliance, Inc. of Sunnyvale, Calif., as described further below. Once all of the changes have been received, the algorithm proceeds to efficiently "walk through" (traverse) the data sets (or information representing their content) and generate user-level descriptions of the differences. For purposes of this overview, the two data sets are referred to as DataSetA and DataSetB. It is assumed that both data sets are hierarchical, as in a typical file system, i.e., a tree having a root and multiple nodes (directories and files) branching off from the root. FIG. 8 shows an example of a hierarchical data set. DataSetA is treated as the "goal" or "current" data set, and DataSetB is treated as the "base" or "old" data set. However, these descriptions are not required. That is, DataSetB could be the newer version of the data set.

There are two types of differences that need to be captured—changes to files and changes to directories. File changes involve modifying the contents, permissions, owners, etc. of the file. Directory changes involve renaming, creating, deleting, or hard linking files. Directory changes affect only the names of the data in the system, whereas file changes affect the underlying data.

In general, for each file's inode that is different between the two data sets, the method records that information. The method also records an identifier of the parent directory in a traversal map, indicating that the parent directory is "to be examined", because the parent directory contains a file that has been modified. The traversal map is later used to speed up the output phase, as described below. The identity of the parent can be tracked using the parent map, in which is recorded every file's parents, or any other suitable technique. That parent's parent is then recorded in the traversal map (i.e. marked as "to be examined"), because that directory contains a directory that contains a file that was modified. An entry is also added to the child map to indicate that the child directory is the child of the parent. The child map is used to rapidly identify which children in a directory are "to be examined" during the output phase, as described below.

This process is repeated until the algorithm either reaches the root of the data set or encounters a parent that has already been marked "to be examined" (i.e., is already represented in the traversal map). The algorithm can stop moving up the tree when it sees a directory already marked as "to be examined", because this means some previous changed file has caused the path to the root of the data set to be marked as "to be examined".

Thus, for every directory's inode that is different between the two data sets, the above is done, and then the contents of that directory are compared between the two data sets and the specific differences are determined. The files that are unique to DataSetA are recorded as "created" (and, in certain embodiments, their parent is recorded in the parent map). The files that are unique to DataSetB are recorded as "deleted" (and their parent is ultimately removed from the parent map). The files that have been renamed are treated as both created and deleted.

Once all changes have been recorded, a list of changes is printed during the output phase. There are three types of changes to be recorded. First, changes to file data only can have the path recorded from either data set, because the path is the same. However, files existing in only one of the data sets must record the path from that data set. If a file is found to be renamed, the path must be extracted from both data sets, in order to record that it was renamed from 'A' to 'B'.

In the output phase, for each data set the tree is walked (traversed) in depth-first order, utilizing the information in the traversal map (about "to be examined" directories) and the change map (about the changes to files and directories) to accurately capture the unique "create", "delete", "rename", and "modify" entries. User-level difference information is output to a file. The information in the traversal map reduces the amount of work necessary to describe the differences. As noted above, one of the weaknesses of the current state-of-the-art is that the entire file system tree is typically walked. Since data sets often have only a few changes, and most of them are localized in still fewer regions, avoiding a full tree walk is a significant advantage. Thus, the technique introduced herein looks through only the branches of the data set that lead to differences.

Moreover, the depth-first search reduces the amount of work in building up path names. Since changes tend to be localized, there will commonly be many files in one directory/ subtree that are different. By using a depth-first approach, the already computed common path can be reused, just substituting in the unique file names each time. This is an improvement over constantly walking up the tree to compute the entire path name each time.

Certain read-ahead optimizations can also be used to accelerate the output phase. The algorithm as described thus far dramatically reduces the search space, and hence, the amount of work needed to describe the differences between two data sets. However, it has one shortcoming: poor disk utilization. Disks can provide extremely high throughput, but they have relatively long latencies. Thus, one needs to tell the disk to preload what data to read well before the data is needed. That way, the data will be stored in memory by the time it is needed.

Depth-first search algorithms, however, are well known for their poor structure for read-ahead. In general, the system has no warning about what it will need to read until it needs to read it. Assume, for example, that a given file is 20 directories below the root (e.g., a/b/c/d/e/f/g/h/i/j/k/l/m/n/o/p/q/r/s/t/file) . The algorithm introduced herein, as described thus far, does not know to read ahead directory 'm' until it sees that it is the child of directory 'l'; and at that point, it is not reading ahead. Ideally if the system reads 'a', all of the children 'b' through 't' would reside within that one data block, so they would also be in memory. Unfortunately, most systems store each directory separately. This presents an extremely challenging problem.

The solution involves creating and using the child map to enable some read-ahead. When directory 'a' from the example above is loaded, if the system is able to know that it needs to load 'b' through 't', then it can issue the requisite read-ahead requests. That cannot be done normally, because the relationship between 'a' through 't' is kept in the file system itself, each directory in its own set of disk blocks. The child map, however, dramatically compresses the storage of those relationships. Instead of one disk block per directory, we can now record the relationship of many (i.e., on the order of 1000) directories in one disk block. As a result, the system can know which directories it needs to load in advance. In short, by creating a compressed version of dataset hierarchy (which is further compressed because it only contains the "to-be-examined" elements), the system can have visibility into which on-disk data blocks need to be preloaded. This optimization enables the system to run at maximum disk speed, while still only looking at the necessary data.

In summary, therefore, the algorithm records relevant information about the differences between the two data sets. It then efficiently walks those data sets, looking only at the nodes of the data set hierarchy that are relevant, while improving disk performance via read-ahead, to describe the user-level differences between those data sets. This technique is described in greater detail below. First, however, it is useful to consider an environment in which the technique can be implemented.

FIG. 1 shows a simple example of a network environment which incorporates a storage server 2. In the illustrated embodiment, the storage server 2 is file server appliance used in a network attached storage (NAS) configuration, otherwise referred to as a "filer". The technique introduced herein can be implemented in the file server 2, or in other devices as described below. For example, the technique can be adapted for use in other types of storage systems, such as storage servers which provide clients with block-level access to stored data or processing systems other than storage servers, data backup systems, etc.

The file server 2 in FIG. 1 is coupled locally to a storage subsystem 4 which includes a set of mass storage devices, and to a set of clients 1 through a network 3, such as a local area network (LAN). Each of the clients 1 may be, for example, a conventional personal computer (PC), workstation, or the like. The storage subsystem 4 is managed by the file server 2. The file server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage subsystem 4 can be organized as a Redundant Array of Inexpensive Disks (RAID), in which case the file server 2 accesses the storage subsystem 4 using well known RAID protocols.

Although not illustrated as such in FIG. 1, the file server 2 may have a distributed architecture; for example, it may include a separate N- ("network") blade and D- (disk) blade (not shown). In such an embodiment, the N-blade is used to communicate with clients 1, while the D-blade includes the file system functionality and is used to communicate with the storage subsystem 4; the N-blade and D-blade communicate with each other using an internal protocol. Alternatively, the file server 2 may have an integrated architecture, where the network and data components are all contained in a single box. The file server 2 further may be coupled through a switching fabric to other similar file servers (not shown) which have their own local storage subsystems. In this way, all of the storage subsystems can form a single storage pool, to which any client of any of the file servers has access.

The file server 2 may be connected as shown to another, similar file server 2A, through a network 3A. File server 2A manages its own storage subsystem 4A. In this way, file server 2A and its storage subsystem 4A can be used to mirror data stored by file server 2 in storage subsystem 4. In addition, file server 2 may be connected to a separate backup system 5, such as a tape backup system, to back up data stored in storage subsystem 4.

As noted above, the technique introduced herein for describing differences between two data sets can be implemented within the file server 2. In addition, or alternatively, the technique could be implemented in, for example, the second file server 2A, the backup system 5, one or more of the clients 1, and/or other types of devices.

Figure 2:
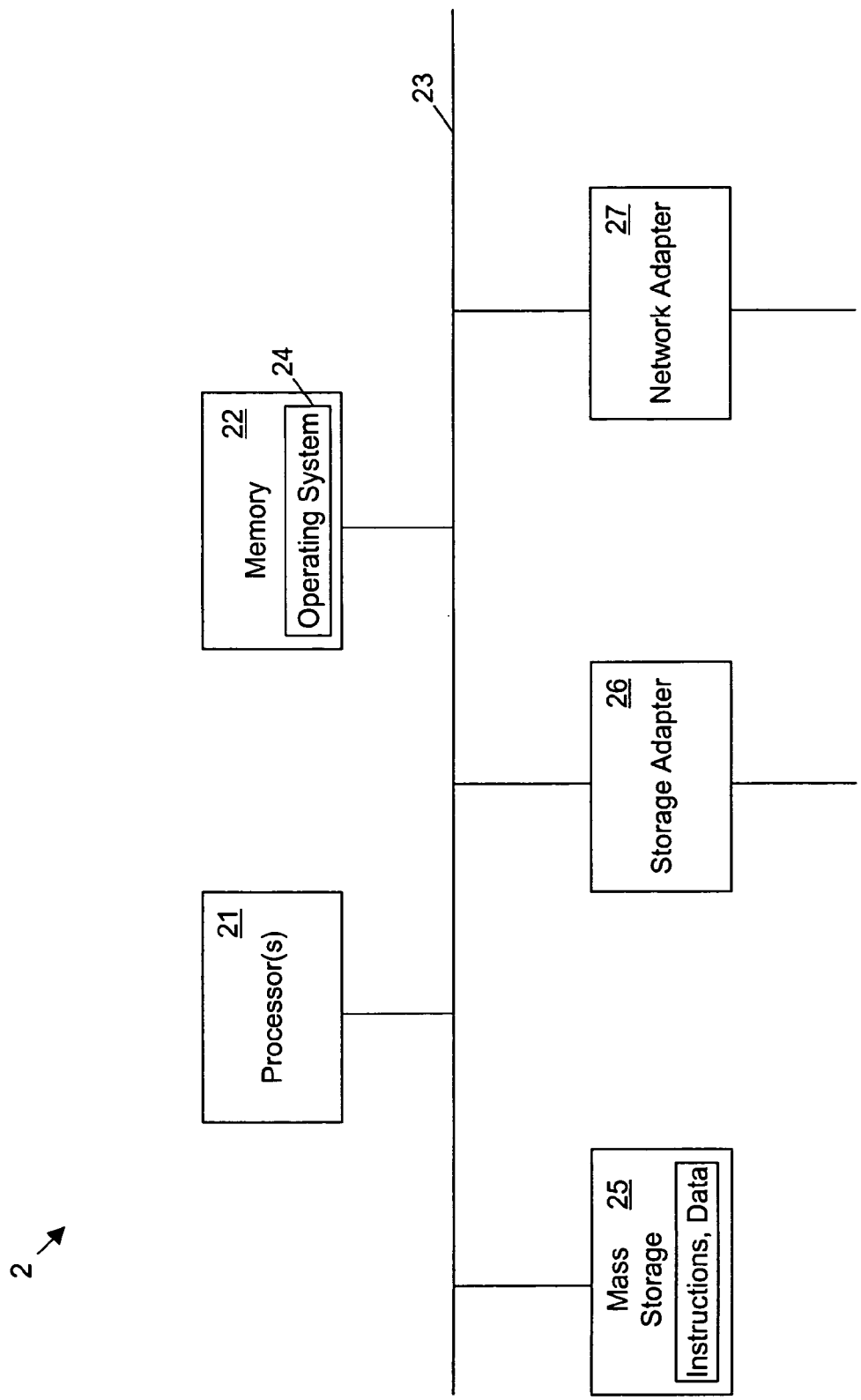
FIG. 2 is a block diagram showing the architecture of a file server that can implement the invention.

FIG. 2 is a block diagram showing the architecture of the file server 2 (or file server 2A), according to certain embodiments. Certain standard and well-known components which are not germane to the present invention are not shown. The file server 2 includes one or more processors 21 and memory 22 coupled to a bus system 23. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the file server 2 and, thus, control its overall operation. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 includes the main memory of the file server 2. Memory 22 represents any form of random access memory (RAM), read-only memory (ROM), flash memory, or the like, or a combination of such devices. Memory 22 stores, among other things, the operating system 24 of the file server 2, in which the technique introduced herein can be implemented.

Also connected to the processors 21 through the bus system 23 are one or more internal mass storage devices 25, a storage adapter 26 and a network adapter 27. Internal mass storage devices 25 may be or include any conventional medium for storing large volumes of data in a non-volatile manner, such as one or more magnetic or optical based disks. The storage adapter 26 allows the file server 2 to access the storage subsystem 4 and may be, for example, a Fibre Channel adapter or a SCSI adapter. The network adapter 27 provides the file server 2 with the ability to communicate with remote devices, such as the clients 1, over a network and may be, for example, an Ethernet adapter.

Figure 3:
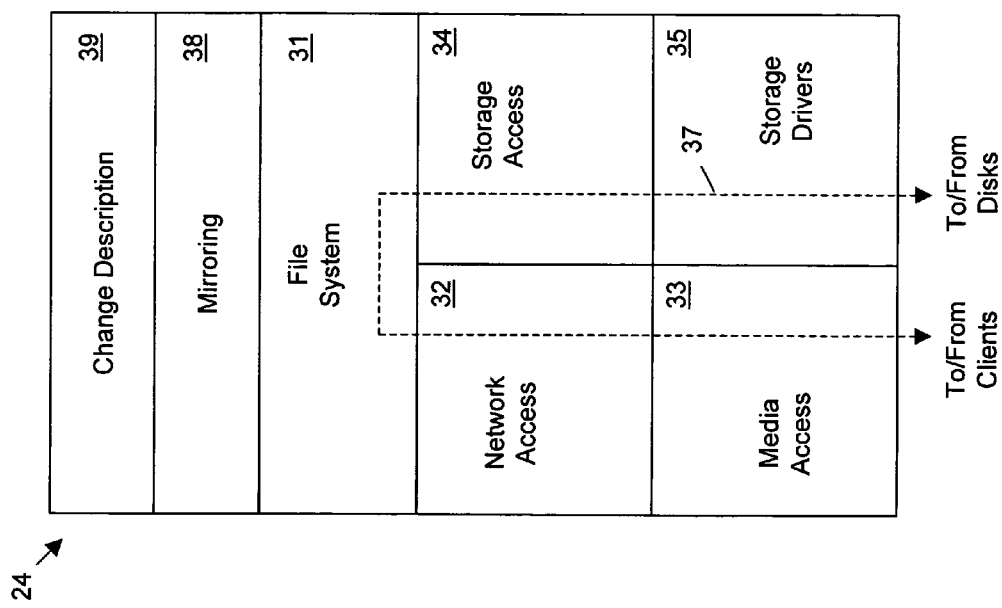
FIG. 3 is a block diagram showing the operating system of a file server according to certain embodiments of the invention.

FIG. 3 shows an example of the operating system 24 of the file server 2. As shown, the operating system 24 includes several software modules, or "layers". These layers include a file system 31. The file system 31 is application-layer software that imposes a structure (hierarchy) on the data stored in the storage subsystem 4 and services read/write requests from clients 1. Note that the term "file system" also sometimes refers to the actual stored data or its hierarchical structure; the particular meaning in any given instance will be readily apparent to those skilled in the relevant art, from context.

Logically "under" the file system 31, the operating system 24 also includes a network access layer 32 and an associated media access layer 33, to allow the file server 2 to communicate over the network 3 (e.g., with clients 1). The network access 32 layer implements one or more of various higher-level network protocols, such as Network File System (NFS), Common Internet File System (CIFS), Hypertext Transfer Protocol (HTTP) and/or Transmission Control Protocol/Internet Protocol (TCP/IP). The media access layer 33 includes one or more drivers which implement one or more lower-level protocols to communicate over the network, such as Ethernet.

Also logically under the file system 31, the operating system 24 includes a storage access layer 34 and an associated storage driver layer 35, to allow the file server 2 to communicate with the storage subsystem 4. The storage access layer 34 implements a higher-level disk storage protocol, such as RAID, while the storage driver layer 35 implements a lower-level storage device access protocol, such as Fibre Channel Protocol (FCP) or small computer system interface (SCSI). Also shown in FIG. 3 is the path 37 of data flow, through the operating system 24, associated with a read or write operation.

In certain embodiments, as illustrated in FIG. 3, the operating system 24 further includes a mirroring layer 38 logically on top of the file system 31, to implement data mirroring techniques in conjunction with another file server (e.g., file server 2A). The mirroring layer 38 can be used to generate non-user level difference information about two data sets, which is then used by the technique introduced herein to generate user-level difference information.

On top of the mirroring layer 38, the operating system also includes a change description layer 39. The change description layer 39 is an application layer which implements the technique introduced herein, to output the user-level difference information about two data sets to a file and/or a display device. The change description layer 39 may receive the non-user level change information from the mirroring layer 38 in batch form or as a stream of change data; the latter is generally assumed to be the case in the description which follows.

Figure 9:
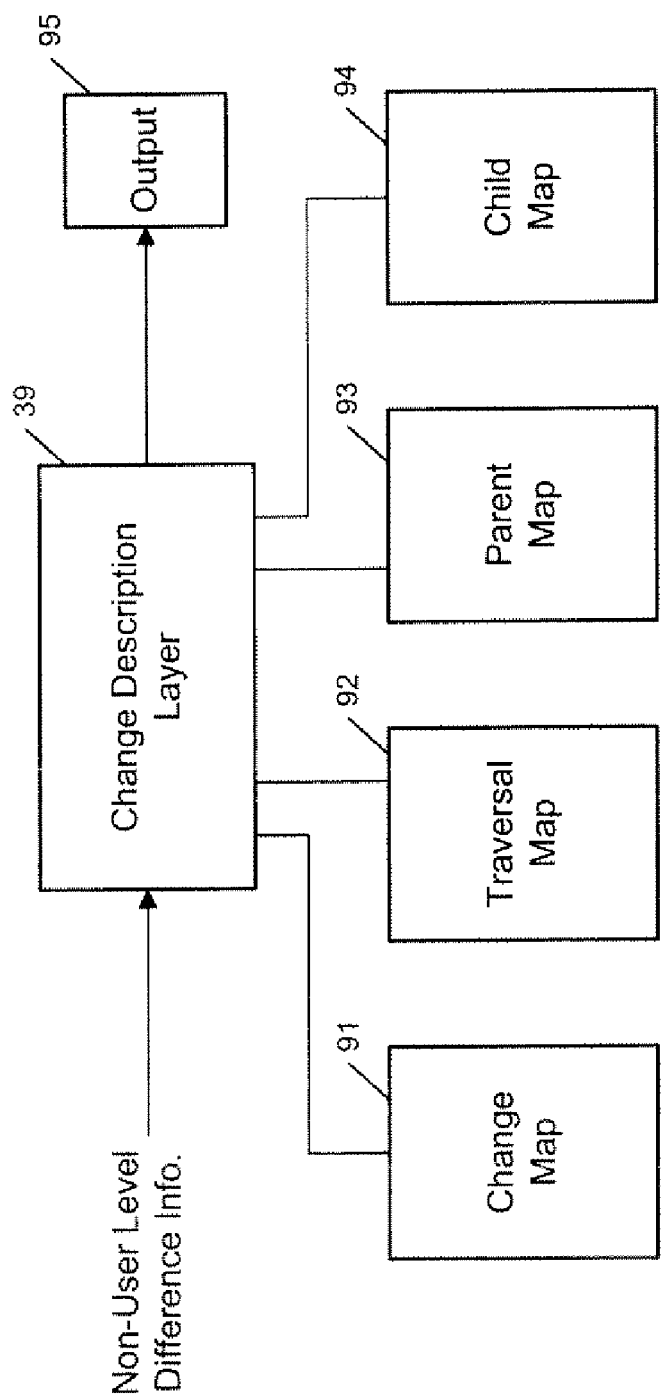
FIG. 9 shows the change description module and data structures it uses.

FIG. 9 shows the change description layer 39 and the various data structures it uses, according to embodiments of the invention. As shown, and as indicated above, the change description layer 39 uses a change map 91, a traversal map 92, a parent map 93, and a child map 94, to generate and output user-level difference information about two data sets. The change map 91 and traversal map 92 can each be considered to include two separate maps, one for each of the two data sets that are to be compared (e.g., DataSetA and DataSetB).

Figure 4:
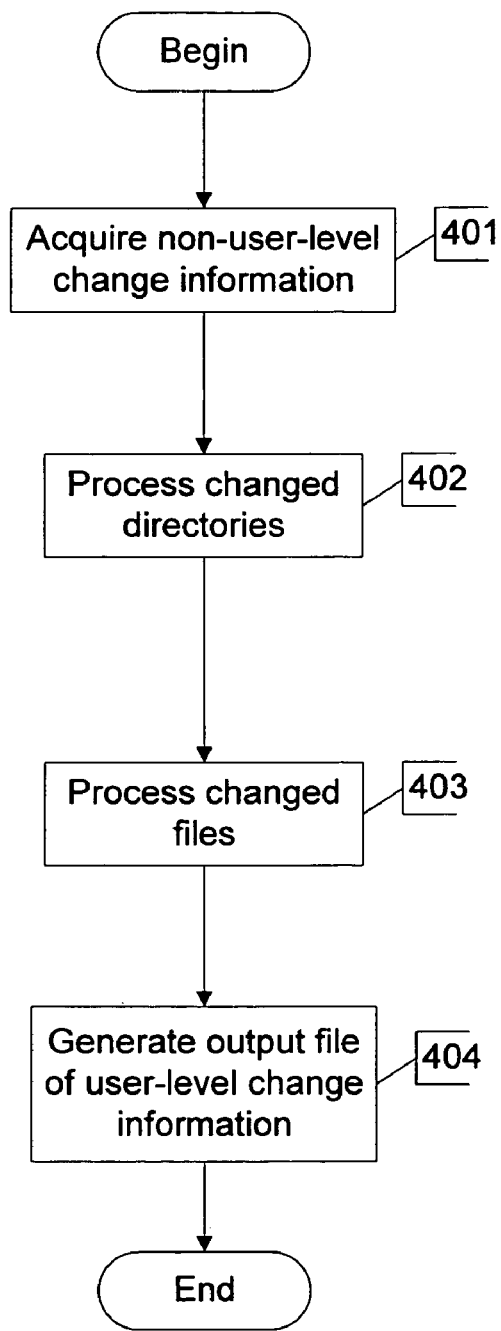
FIG. 4 illustrates the overall process of describing the differences between two data sets according to certain embodiments if the invention.

FIGS. 4 through 7 illustrate the algorithms that may be implemented by change description layer 39 according to embodiments of the invention. FIG. 4 illustrates the overall process of the technique. Initially, non-user level change information about two data sets is acquired by the change description layer 39 at block 401. Alternatively, this information can be acquired concurrently each with block 402, described below. The non-user-level change information may be acquired from the mirroring layer 38. The remainder of the process has three major phases. First, at block 402 all changed directories are processed by the change description layer 39. After all directories are processed, all changed files are processed at block 403 by the change description layer 39. Finally, at block 404 an output file is generated by the change description layer 39, which includes user-level change information relating to all of the changed directories and files. Blocks 402, 403 and 404 are described further below.

Before further considering blocks 402, 403 and 404, note that in order to output user-level change information quickly and efficiently, the change description layer 39 first ascertains the user-level changes based on the non-user level change information it receives from the external source (e.g., from the mirroring layer 38). This aspect of the overall process is actually distributed amongst blocks 402, 403 and 404, but will now be described with reference to FIG. 10, according to certain embodiments of the invention.

Data set changes for directories in a "user-level" form are typically not directly available from the information provided in the list of differences between two data sets in raw form. For example, replication methods may transmit "before" and "after" images of directories or portions of directories from the source and expect the destination to delete the information contained in the "before" image and add the information from the "after" image. It is common for some directory entries to be in both the "before" and "after" images, in which case, no net change has occurred. With this type of protocol, the net changes are not readily available as the changes are being received. Some extra processing is required to determine the net "Creates", "Deletes", "Renames", and "No Changes".

Figure 10:
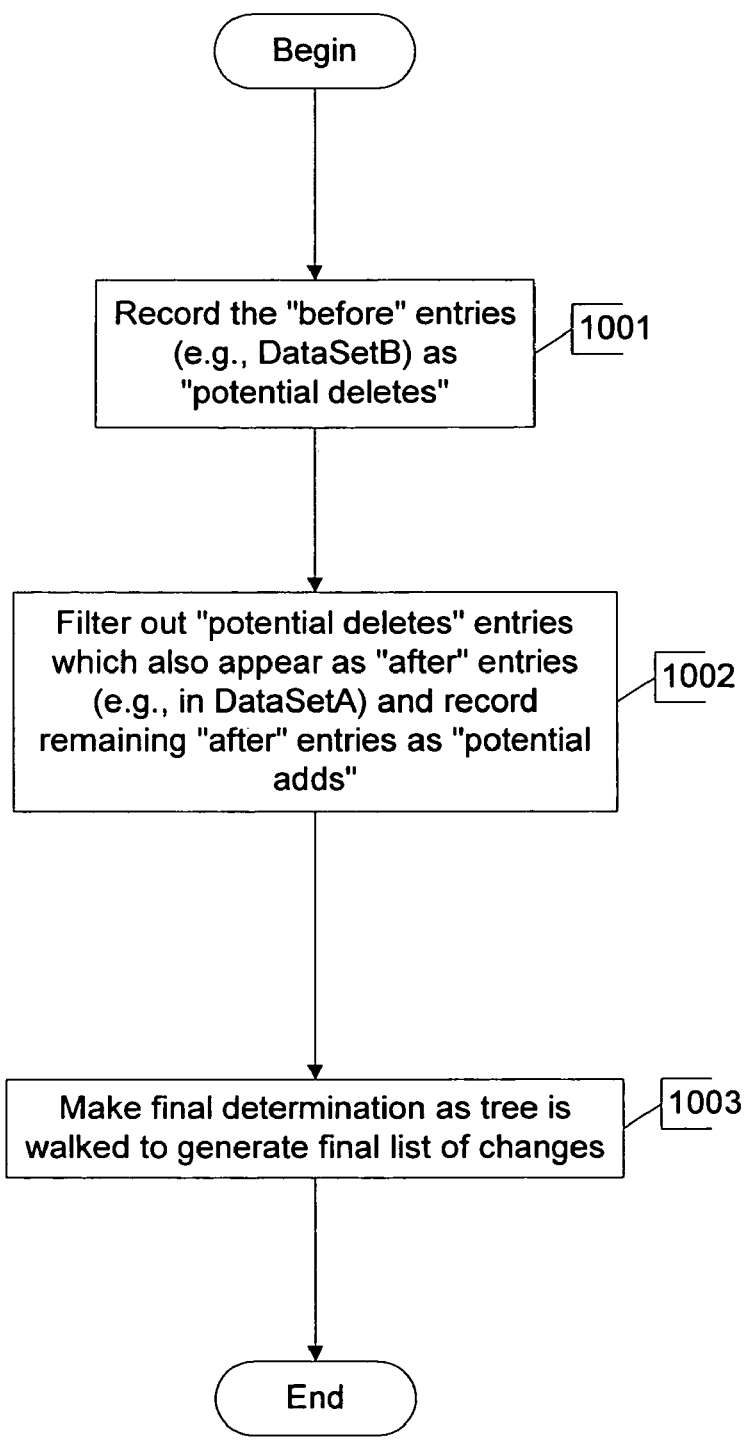
FIG. 10 shows a process of ascertaining user-level changes from non-user level change information.

To generate the net (user-level) changes, therefore, the following three-step process may be used, as illustrated in FIG. 10. Initially, the change description layer 39 records the "before" entries (e.g., DataSetB) as "potential deletes" in the change map 91 at block 1001. At block 1002, as "after" entries (e.g., DataSetA) are received, the change description layer 39 filters out "potential deletes" entries which also appear as "after" entries and record remaining "after" entries as "potential adds". The change description layer 39 then makes a final determination as the tree is walked (during the output phase 404) to generate the final list of changes.

This approach relies on having access to two data sets (e.g., old and new, or two independent data sets to be compared), which can be provided through some type of "snapshot" technology.

The basic idea is that some decisions about the ultimate changes can be ascertained as the stream of changes is received, while other decisions can only be made after the entire data stream is received. For example, if the change description layer 39 sees that a directory entry is in the "to-be-deleted" list (the "before" image of the directory) as it receives it, it does not know whether the delete is offset by a corresponding "to be added" entry (in the "after" image of the directory) or another "to be added" entry for the same file (inode) but with a different name. It therefore records the fact that it is a "potential delete" (block 1001) in the change map 91. At the time the change description layer 39 is processing the "to be added" entries it can make some decisions. For example, if it receives a "to be added" entry it can check whether that entry is present in the previous version of the data set. If it is, the change description layer 39 knows that nothing with respect to this entry has changed. However, if there is no matching entry in the previous version, it does not know whether this is a rename, a new file, or an additional hard link for an existing file. Therefore, it needs to record a "potential add" entry for the inode (block 1002) and determine what it means after it has received all of the "to be added" data.

The final resolution will take place as the change description layer 39 is walking through the tree (block 1003; described further below). During the tree walk the change description layer 39 knows the final name(s) of the file. It can then make a determination as to what the ultimate change is for each file by examining the "previous version" tree and the "current tree" using the previously recorded "potential delete" and "potential add" bits to guide its checking. Typically the majority of the files in the tree will not have any flags set, so the extra checking has minimal performance impact.

The result of the three steps is to produce the necessary user-level "create", "delete", and "rename" information.

Figure 5:
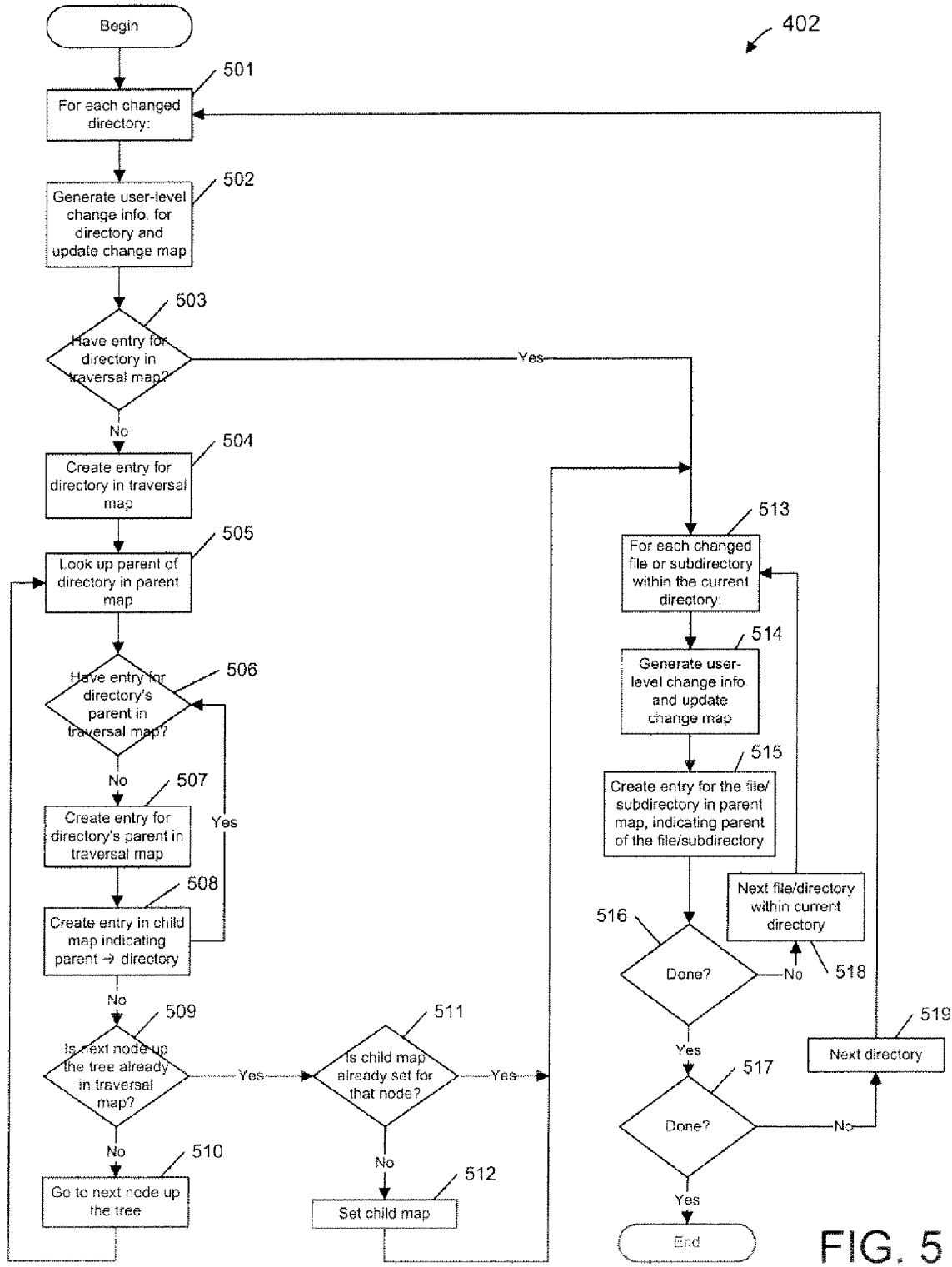
FIG. 5 illustrates the phase of processing changed directories according to certain embodiments of the invention.

The above-mentioned phases of processing changed directories (block 402 in FIG. 4), processing changed files (block 403), and the output phase (block 404) all incorporate aspects of the algorithm just described, as will be seen from the following description of those phases. Refer now to FIG. 5, which illustrates the phase of processing changed directories (block 402), according to certain embodiments of the invention. Certain aspects of the process are described with reference to the data set shown in FIG. 8 as an example, in which rectangular-shaped nodes represent directories and circular nodes represent files. The following process is performed for each changed directory (as denoted by blocks 501, 517 and 519), and is performed separately for each of the two data sets (deletes are processed on the "old" tree and creates and modifies are processed on the "new" tree.)

First, at block 502 the process generates user-level change information for the directory, in the manner described with reference to FIG. 10 (blocks 1001 and 1002), and updates the change map 91 accordingly. At block 503 the process determines whether there is an entry for this directory in the traversal map. If there is an entry for this directory in the traversal map, then the process continues with block 513, discussed below; otherwise, the process continues with block 504. At block 504 the process creates an entry for directory in the traversal map 92. This entry identifies the directory as "to be walked" and is used during the output phase (block 404) to reduce the number of nodes in the tree that are walked when generating output file.

Next, at block 505 the process looks up the parent of the current directory in the parent map 93. The process then determines at block 506 whether there is an entry for the current directory's parent in the traversal map 92. For example, referring to FIG. 8, if the current directory being processed is directory C, block 506 determines whether the traversal map includes an entry representing directory B, the parent of directory C. If there is such an entry, the process continues with block 508, described below. If there is no such entry in the traversal map 92, then at block 507 the process creates an entry for the directory's parent in the traversal map 92. Next at block 508 the process creates an entry for the parent in the child map 94, indicating the parent-child relationship between the current directory and its parent (i.e., parent→directory). For example, in FIG. 8, if the current directory being processed is directory C, block 508 creates an entry corresponding to directory B, indicating that directory C is a child of directory B (e.g., B→C).

The process then determines at block 509 whether the next node up the tree is already represented in the traversal map 92 (i.e., already marked as "to be walked"). For example, if directory C was being processed, block 509 determines whether directory B is already represented in the traversal map. If not, the process proceeds at block 510 to the next node up the tree and then loops back to block 504. If the next node up the tree is already in the traversal map 92, then at block 511 the process determines whether the child map 94 is already set for that node. It is important that each directory is represented only once in the child map. The child map represents the set of unique subdirectories that should be traversed in the processing phase. If a directory is included twice, it would be processed twice, which would be a waste of effort. To determine whether a directory has already been included in the child map, the process searches the set of children of the parent directory looking for a match. If the child map 94 is determined to be already set in block 511, the process proceeds with block 513, described below. Otherwise, the process sets the child map 94 at block 512 and then proceeds with block 513.

Next, as denoted by blocks 513, 516 and 518, the process repeats the following subprocess for each entry (i.e., each file or subdirectory) within the current directory. First, at block 514 the subprocess generates user-level change information in the manner described above with reference to FIG. 10, and updates the change map 91 for a particular file or subdirectory that is within the current directory. At block 515 the set process creates an entry for the file or subdirectory in the parent map 93, identifying the parent of the file or directory.

As indicated above, the foregoing process is repeated for each changed directory (per blocks 501, 517 and 519).

Figure 6:
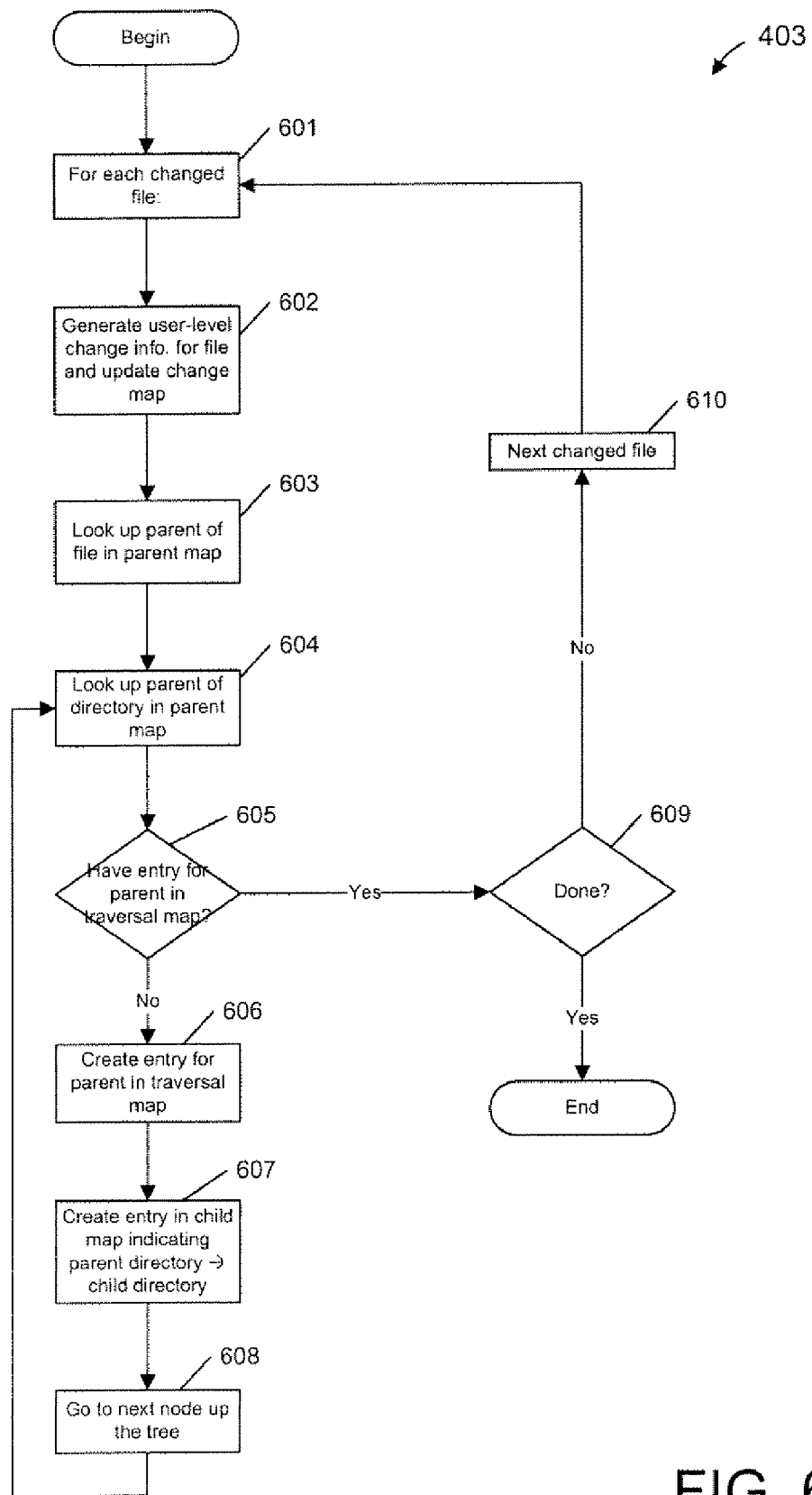
FIG. 6 illustrates the phase of processing changed files according to certain embodiments of the invention.

After all directories are processed, all changed files are then processed at block 403, as indicated in FIG. 4. FIG. 6 illustrates the phase of processing changed files (block 403), according to certain embodiments of the invention. The following process is performed for each changed file, as denoted by blocks 601, 609 and 610.

First, at block 602 the process generates user-level change information for the file, in the manner described above with reference to FIG. 10 (blocks 1001 and 1002), and updates the change map 91 accordingly. Next, at block 603 the process looks up the parent directory of the current file in the parent map 93. The process then enters the loop which includes blocks 604 through 608.

At block 604 the process looks up the parent directory of the parent directory that was identified in block 603. For example, in the example of FIG. 8, if the current file processed in block 602 was node E, the first iteration of block 604 looks up the parent of node C (which is the parent of E), i.e., node B. The process then determines at block 605 whether there is an entry for the parent directory (e.g., node B) in the traversal map 92. If there is such an entry, the process continues with block 609. If there is no such entry in the traversal map 92, then at block 606 the process creates an entry for the parent directory (e.g., node B) in the traversal map 92.

Next at block 607 the process creates an entry for the parent directory in the child map 94, indicating the parent-child relationship between the parent directory and its child directory. The first iteration of block 607 will place an entry in the child map for the parent directory of the parent directory of the current file. For example, if the current file in block 602 was node E in FIG. 8, the first iteration of block 607 will place an entry in the child map for node B, indicating the relationship B→C. Subsequent iterations of block 607 would be similar, moving up the tree.

After block 607, the process then proceeds at block 608 to the next node up the tree and then loops back to block 604.

Figure 7:
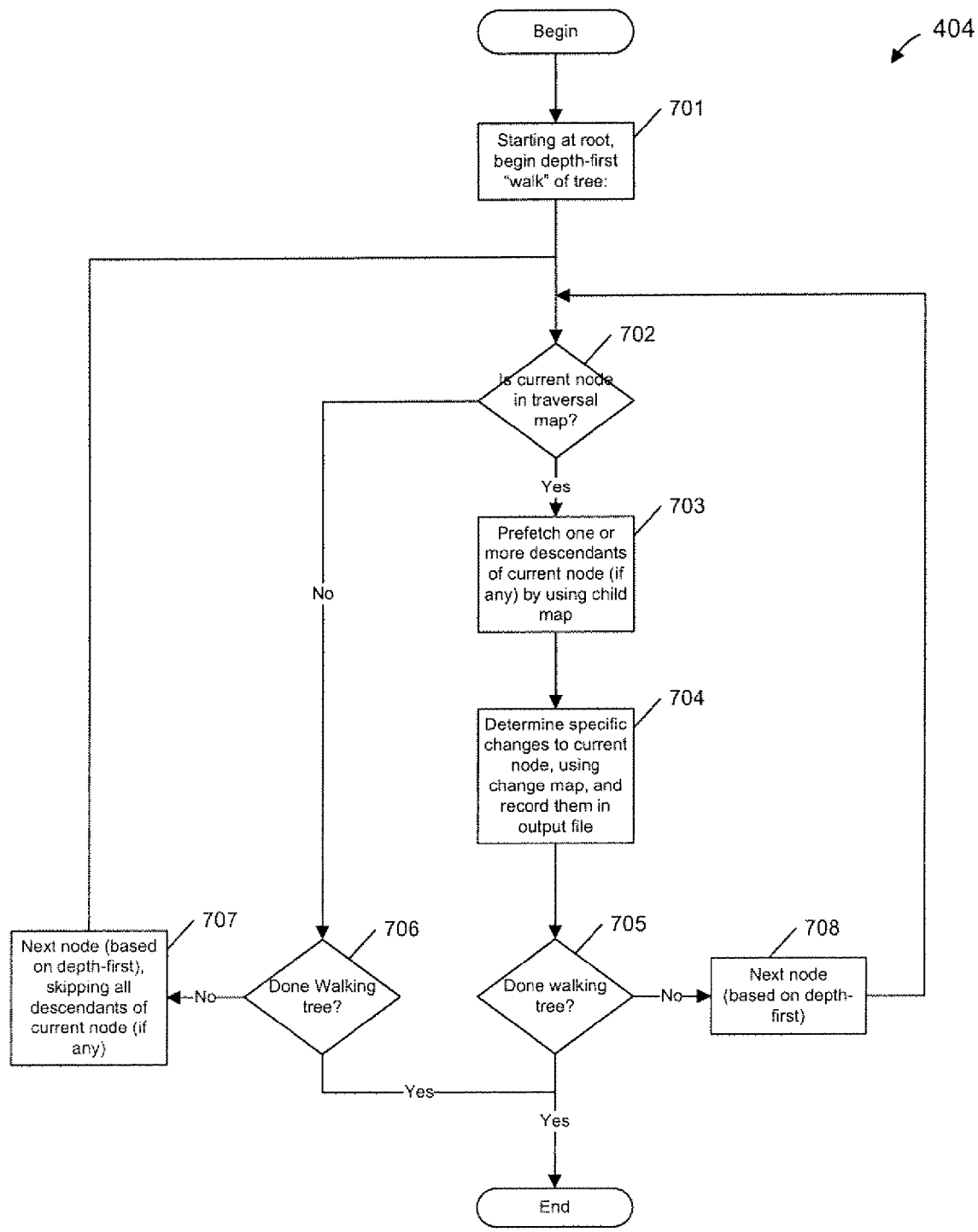
FIG. 7 shows the process of generating an output file with user-level change information according to certain embodiments of the invention.

After all changed directories and files have been processed, an output file is generated (block 404 in FIG. 4) which includes user-level change information relating to all of the changed directories and files. FIG. 7 shows the process (block 404) of generating the output file. As of the described, this process optionally includes the read-ahead (prefetch) optimization mentioned above.

The process of FIG. 7 is performed separately for each of the two data sets that are being compared. Starting at the root of the tree, the process begins a depth-first walk of the tree (block 701). Upon initially selecting a given node (a directory or file) in the tree, the process determines at block 702 whether the current node is represented in the traversal map 92 (i.e., marked as "to be walked"). If the current node is not represented in the traversal map 92, and if the tree walk is not yet complete (block 706), any descendants of the current node are skipped and the next node in the tree is selected according to the depth-first algorithm at block 707. The process then loops back to block 702. The result of blocks 702, 706 and 707 in combination is that only relevant parts of the tree are walked, which speeds up the overall process.

If the current node is represented in the traversal map 92, the process continues with block 703. At block 703 the process optionally prefetches one or more children and potentially more remote descendants of the current node, if it has at least one child. This prefetching reduces the overall latency associated with disk reads. At block 704 the process then makes the final determination regarding the specific user-level changes to that node (per block 1003 in FIG. 10) and records them in an output file 95. Following block 704, if the tree walk is not complete (block 705), then the next node in the tree is selected at block 708 according to the depth-first algorithm, and the process then loops back to block 702.

Thus, a method and apparatus to quickly and efficiently generate user-level information about differences between two data sets have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer implemented method comprising:
   acquiring information representing differences between a first data set and a second data set, the first and second data sets each including a plurality of nodes;
   building a traversal map that identifies only nodes for which a difference has been detected between the first and second data sets;
   traversing a hierarchy of nodes by successively examining nodes in the hierarchy to generate an output including user-level difference information about the first and second data sets, wherein said traversing includes using the traversal map to avoid traversing at least some of the nodes in the hierarchy by ignoring nodes not represented in the traversal map during said traversing;
   building a child map that includes information identifying parent-child relationships of nodes of the first and second data sets; and using the child map to prefetch nodes during said traversing.

2. A method as recited in claim 1, wherein the user-level difference information is human readable and comprises path/name information for files and directories of the first and second data sets.

3. A method as recited in claim 1, wherein said traversing further comprises:
using a depth-first algorithm in conjunction with the traversal map to traverse the hierarchy of nodes.

4. A method as recited in claim 1, wherein the traversal map identifies nodes which have changed or which are parents of nodes that have changed.

5. A method as recited in claim 1, wherein said acquiring difference information relating to the first and second data sets comprises acquiring non-user level difference information relating to the first and second data sets;
the method further comprising generating the user-level difference information relating to the first and second data sets.

6. A computer implemented method of generating user-level difference information relating to a first data set and a second data set, the method comprising the steps of:
A) acquiring difference information relating to the first and second data sets, the first and second data sets each structured as a hierarchy of nodes, each hierarchy of nodes including a root, each node being a file or a directory;
B) identifying nodes which represent differences between the first and second data sets based on the change information;
C) for each node which represents a difference between the first and second data sets,
1) indicating difference information for the node in a change map,
2) creating an entry representing the node in a traversal map,
3) creating an entry representing the parent of the node in the traversal map if such an entry does not already exist in the traversal map,
4) creating an entry in a child map, indicating that the node is a child of the parent, and
5) repeating steps 3) and 4) until reaching the root or a node already represented in the traversal map; and
D) traversing trees representing the first and second data sets by successively examining nodes in the hierarchy to generate a human-readable or computer application-readable output including user-level difference information between the first and second data sets, while using the traversal map and a depth-first algorithm to avoid traversing at least some nodes of the trees during said traversing.

7. A method as recited in claim 6, wherein the user-level difference information is path/name information for files and directories of the first and second data sets.

8. A method as recited in claim 6, wherein said receiving difference information relating to the first and second data sets comprises receiving non-user level difference information relating to the first and second data sets;
the method further comprising generating user-level difference information relating to the first and second data sets.

9. A method as recited in claim 6, further comprising, using the child map to prefetch nodes during said traversing.

10. A method as recited in claim 6, wherein said generating output includes, for each node in the tree which represents a change between the first and second data sets:
1) writing user-level difference information for a current node to an output file based on information in the change map;
2) determining whether the current node is represented in the traversal map;
3) if the current node is not represented in the traversal map, then skipping all descendants of the current node in said generating output; and
4) if the current node is represented in the traversal map, then continuing said generating output from a child of the current node.

11. A processing system comprising:
a processor; and
a memory accessible to the processor and containing software which, when executed by the processor, causes the processing system to perform a process including
generating user-level information that represents differences between a first data set and a second data set, the first and second data sets each structured as a hierarchy of nodes,
building a traversal map that identifies nodes of one or both of the first and second data sets, each node in the traversal map being a node for which a difference has been detected between the first and second data sets,
traversing a hierarchical structure by successively examining nodes in the hierarchy to generate and output user-level difference information representing differences between the first and second data sets, wherein said traversing includes referring to the traversal map during said traversing and ignoring nodes which are not represented in the traversal map,
building a child map that includes information identifying parent-child relationships of nodes of the first and second data sets; and
using the child map to prefetch nodes during said traversing.

12. A processing system as recited in claim 11, wherein the processing system comprises a storage server.

13. A processing system as recited in claim 12, wherein the storage server is a file server.

14. A processing system as recited in claim 11, further comprising:
a storage interface through which to communicate with an array of storage devices for purposes of reading data from, or writing data to, the storage devices; and
a network interface through which to communicate with a plurality of clients over a network;
the processing system being configured to service requests from the clients relating to data stored in the array of storage devices.

15. A processing system as recited in claim 11, wherein the user-level difference information is pathname information for files and directories of the first and second data sets.

16. A processing system as recited in claim 11, wherein the user-level difference information comprises path/name information for files and directories of the first and second data sets.

17. A processing system as recited in claim 11, wherein said traversing further comprises:
using a depth-first algorithm in conjunction with the traversal map to traverse the hierarchical structure.

18. A processing system as recited in claim 11, wherein the traversal map identifies nodes which have changed or which are parents of nodes that have changed.

19. A storage system comprising:
means for servicing a request from a client to access data stored in a set of storage devices;

means for acquiring information representing differences between a first data set and a second data set, at least one of the first and second data sets being stored in the set of storage devices, the first and second data sets each structured as a hierarchy of nodes;

means for building a traversal map that identifies only nodes for which a difference has been detected between the first and second data sets;

means for traversing a hierarchy of nodes representing the first or second data set by successively examining nodes in the hierarchy, to generate an output including user-level difference information about the first and second data sets, including using the traversal map to avoid traversing at least some nodes such that nodes not represented in the traversal map are skipped during said traversing;

means for building a child map that includes information identifying parent-child relationships of nodes of the first and second data sets; and means for using the child map to prefetch nodes during said traversing.

20. A storage system as recited in claim 19, wherein the output indicating user-level differences comprises path/name information for files and directories of the first and second data sets.

21. A storage system as recited in claim 19, wherein said means for traversing further comprises:

means for using a depth-first algorithm in conjunction with the traversal map to traverse the hierarchy of nodes.

22. A storage system as recited in claim 19, wherein the traversal map identifies nodes which have changed or which are parents of nodes that have changed.

23. A storage system as recited in claim 19, wherein said means for acquiring difference information relating to the first and second data sets comprises means for acquiring non-user level difference information relating to the first and second data sets;

the storage system further comprising means for generating user-level difference information relating to the first and second data sets.

24. A computer implemented method comprising:

acquiring information representing differences between a first data set and a second data set, the first and second data sets each including a plurality of nodes;

building a third data set that identifies only nodes for which a difference has been detected between the first and second data sets;

processing a hierarchy of nodes by successively examining nodes in the hierarchy to generate an output including file path and file name information for the first and second data sets, including using the third data set to identify nodes in the hierarchy that do not need to be processed for the purpose of generating said output, and skipping the nodes that are not identified in said processing;

building a child map that includes information identifying parent-child relationships of nodes of the first and second data sets; and using the child map to prefetch nodes during said processing.

25. A method as recited in claim 24, wherein the output is human readable and comprises path and name information for files and directories of the first and second data sets.

26. A method as recited in claim 24, wherein said processing further comprises:

using a depth-first algorithm in conjunction with the third data set to traverse the hierarchy of nodes.

27. A method as recited in claim 24, wherein the third data set identifies nodes which have changed or which are parents of nodes that have changed.

28. A method as recited in claim 24, wherein said acquiring difference information relating to the first and second data sets comprises acquiring non-user level difference information relating to the first and second data sets;

the method further comprising generating the user-level difference information relating to the first and second data sets.

29. A computer implemented method comprising:

acquiring non-user-level difference information representing differences between a first data set and a second data set, the first and second data sets each including a plurality of nodes;

building a traversal map that identifies only nodes for which a difference has been detected between the first and second data sets; and traversing a hierarchy of nodes by successively examining nodes in the hierarchy in a depth-first order, to generate an output including user-level difference information about the first and second data sets based on the non-user-level difference information, while skipping nodes not represented in the traversal map during said traversing;

building a child map that includes information identifying parent-child relationships of nodes of the first and second data sets; and using the child map to prefetch nodes during said traversing.

* * * * *